(12) United States Patent
Ma et al.

(10) Patent No.: US 6,375,788 B1
(45) Date of Patent: *Apr. 23, 2002

(54) METHOD OF COATING MELAMINE RESIN ON LAMINATING PAPER

(75) Inventors: Muyuan M. Ma, Round Rock; Peter C. Gaa, Temple; Jay T. Oliver; Timothy J. Lay, both of Belton, all of TX (US)

(73) Assignee: Premark RWP Holdings, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,002

(22) Filed: Jul. 16, 1996

(51) Int. Cl.⁷ .................................................. C09J 5/02
(52) U.S. Cl. ..................... 156/307.4; 156/278; 156/310; 156/312; 428/530
(58) Field of Search ....................... 428/530; 156/307.4, 156/310, 278, 312

(56) References Cited

U.S. PATENT DOCUMENTS

| | | | |
|---|---|---|---|
| 2,773,794 A | | 12/1956 | Fraser et al. |
| 2,930,727 A | * | 3/1960 | Baranyi .................... 156/307.4 |
| 3,454,457 A | | 7/1969 | Hale et al. |
| 3,537,950 A | * | 11/1970 | Hale .......................... 428/530 |
| 3,616,021 A | | 10/1971 | Valerius |
| 27,644 A | | 5/1973 | Kelly et al. |
| 3,816,232 A | | 6/1974 | Meiser |
| 3,929,545 A | | 12/1975 | Van Dyck et al. |
| 3,949,133 A | | 4/1976 | Santurri et al. |
| 4,076,896 A | | 2/1978 | Bunkowski |
| 4,258,103 A | | 3/1981 | Hosmer et al. |
| 4,552,792 A | | 11/1985 | Julian et al. |
| 4,557,779 A | | 12/1985 | Bower et al. |
| 4,940,503 A | | 7/1990 | Lindgren et al. |
| 5,089,348 A | | 2/1992 | Louderback |
| 5,116,446 A | * | 5/1992 | Cannon .................... 156/307.4 |
| 5,261,984 A | | 11/1993 | Minnick et al. |
| 5,425,986 A | * | 6/1995 | Guyette ................... 156/307.4 |

FOREIGN PATENT DOCUMENTS

| | | | |
|---|---|---|---|
| CA | 781437 | | 3/1968 |
| DE | 2024778 A | | 2/1971 |
| DE | 3233795 A1 | | 3/1984 |
| EP | 0056267 AZ | | 7/1982 |
| FR | 2 375 038 | | 7/1978 |
| FR | 2 492 731 | | 4/1982 |
| GB | 917605 | * | 2/1963 .................. 156/310 |
| JP | 58199151 | | 11/1983 |

* cited by examiner

Primary Examiner—John J. Gallagher
(74) Attorney, Agent, or Firm—Baker Botts L.L.P.

(57) ABSTRACT

Decorative paper with a wear resistant decorative layer is made by limiting the flow of melamine resin through the decorative paper. A partially cured melamine resin impregnated overlay is placed over non-impregnated decorative paper and cured at temperatures of about 230–310° F. (110–155° C.) and pressures of greater than about 300 psi (20 bar) and preferably about 750–1500 psi (51–102 bar) for causing melamine resin to flow from the overlay into the decorative paper and for substantially fully curing the melamine resin. Flow of the melamine resin is limited to about 10–20 and preferably about 12–17 percent by weight of the impregnated overlay. Flow of melamine resin in impregnated decorative paper is limited to about 1–3 and preferably about 1–2 percent by weight of the impregnated decorative paper.

9 Claims, No Drawings

METHOD OF COATING MELAMINE RESIN ON LAMINATING PAPER

BACKGROUND OF THE INVENTION

1. Field of the Invention

This invention relates to substantially fully cured melamine formaldehyde resin coated decorative paper that can be adhesively bonded to particle board or other structural substrate. Resin on a decorative surface of paper is cured under temperature and pressure conditions for improving the wear characteristics of the paper without substantially reducing the capability of adhesively bonding the paper to structural substrate. Melamine formaldehyde resin coated decorative paper adhesively bonded to structural substrate is a decorative structural material with good stain and wear characteristics.

2. Description of the Related Art

Melamine resin impregnated decorative paper is commercially laminated to phenol formaldehyde resin impregnated kraft paper and liner board substrate for making high pressure laminate. Melamine resin impregnated decorative paper is also commercially laminated to particle board and other structural substrate for making low pressure laminate. Melamine resin in the impregnated decorative paper flows under laminating temperature and pressure conditions for bonding melamine resin impregnated decorative paper and substrate. Overlay paper impregnated with melamine resin can be laminated over decorative paper for improving the wear characteristics of the laminate. Overlay impregnated with melamine resin can be laminated over decorative paper that is not impregnated with resin. Melamine resin in the impregnated overlay flows under laminating temperature and pressure conditions for bonding overlay impregnated with melamine resin and non impregnated decorative paper. Melamine resin is clear when fully cured and has stain and wear characteristics that has made it the resin of choice for many commercially available laminates. Resistance to discoloration due to heat and light is also realized.

Melamine resins give a thorough impregnation and thereby insure a complete bond when employed in the production of laminates. Melamine resins have been used in the production of decorative, high pressure laminates wherein a plurality of phenolic resin impregnated kraft paper sheets have been used as a laminate core to which is bonded melamine resin impregnated decorative and overlay paper. These laminates are then adhesively bonded to a rigid substrate and used as partitions, walls, doors, table and counter tops, etc. Laminated panels that can readily be fabricated into furniture, kitchen cabinets and the like are produced by applying a single melamine resin impregnated decorative paper to a particleboard substrate at much lower pressure. These laminate panels have been designated "low pressure" panels. (U.S. Pat. No. 4,076,896, Bunkowski)

Decorative paper is made from bleached wood pulp that is at least 60% in alpha cellulose content. Decorative paper is pigmented in a known manner to obtain the desired levels of color and opacity. They range in basis weight from about 50–90 pounds per 3,000 square foot ream. The paper has a controlled pH due to the influence pH has on the reaction rate of the melamine resin after it is applied thereto. Variances in this pH range have adverse effects on the storage life of the treated paper and/or press cycle times when the panel is being produced. Porosity is controlled to assure proper treating of the paper with the resin and pressing of the panel. A paper having too high a porosity will allow too much resin to penetrate and will result in dry spots on the panel produced therefrom. A paper with too low a porosity will not enable sufficient resin to penetrate and the excessive resin on the surface will cause a mottled appearance and surface crazing and/or cracking of the resultant panel made therefrom. (U.S. Pat. No. 4,076,896, Bunkowski)

Impregnation of the paper and drying of the impregnated paper may be effected by conventional treaters and dryers known to those skilled in the art. The resin content of the impregnated paper generally ranges from about 55% to about 65% by weight based on the weight of the impregnated paper. Paper volatile levels are maintained at about 5%±0.5%. A balance between flow levels and treated weight of the treated paper is maintained to assure proper abrasion levels without reducing crack and/or craze resistance. Treated paper is beta-staged by drying at 150–360° F. for about 1 to about 15 minutes, and stored flat in a conditioned storage area. It has a nominal shelf life of at least about 3 months at 70–75° F. and 40–50% relative humidity. (U.S. Pat. No. 4,076,896, Bunkowski)

Core material, i.e., self-supporting substrates useful in producing the decorative low-pressure panels include medium density, mat-formed, wood particleboard and medium density, wood fiberboard. Useful core material, however, must enable the production of full-sized, smooth-faced, well-bonded, crack- and craze-resistant panels. Core materials should be stored for a sufficient time at ambient conditions to achieve an equilibrium temperature and an equilibrium moisture content of 7%±2%. (U.S. Pat. No. 4,076,896, Bunkowski)

The decorated layer may be placed on both sides or only on one side of the self-supporting substrate when panels are being produced. If the decorative sheet is placed only on one side of the substrate, it is preferred that a so-called balance sheet, i.e., a melamine-formaldehyde resin impregnated paper sheet, e.g. of kraft or other paper, sometimes called a cabinet liner, be placed on the other side in order to prevent the resultant panel from warping during pressing. (U.S. Pat. No. 4,076,896, Bunkowski)

In the formation of high pressure laminates, a decorative or print layer is superimposed upon a conventional, phenolic resin-impregnated core, and with a melamine type resin-impregnated overlay disposed protectingly thereupon. The formed stack is then loaded between the polished metal plate of a hydraulic press that is then closed and subjected to a sufficient pressure and heat for an adequate period of time for fusing the stack into a single sheet. A paper suitable for the decorative layer of laminate has requisite porosity for bleeding therethrough of the resins of the core and the overlay during fusing but without necessitating prior impregnation of said layer. For optimum laminate strength the decorative layer must absorb the resins from the overlay and the core to form durable adhesive bonds therewith. (Meiser, U.S. Pat. No. 3,816,232 and Santurri, et. al., U.S. Pat. No. 3,949,133)

In the making of laminated cement forming materials, precured bonded laminate overlay is formed and adhered to an underlying solid substrate. Thermosetting resin in the overlay is substantially cured prior to contact with the underlying substrate. The overlay is formed between two nearly perfectly smooth surfaces. Curing causes the resin material to become thermoset, thereby establishing a fixed final structure. Adhering the precured bonded laminated overlay to solid substrate may be accomplished through the use of pressure and adhesive alone. It is preferred that both pressure and heat be employed to ensure a more secure adhesion. In order to obtain proper adhesion in a hot press between the precured bonded laminate overlay and the solid substrate, a low water content adhesive must be applied between them. While many commercially available adhesives may be employed, a paper glue line sold under the trade name Plyocite PGL (Product No. 42-206) by Reichhold Chemicals, Inc. of Tacoma, Wash. has proven quite satisfactory for such use. Paper glue line consists of an extremely thin sheet of cellulose impregnated with a high amount of resin. Consequently, the paper glue line possesses the adhesion properties of production grade glue, but with a much lower water content. This lower water content is required or blisters will be formed beneath the surface of the overlay, thereby causing improper bonding and potential surface irregularities on the outside surface of the overlay. It is important that the laminate overlay of the present invention is substantially cured separately, away from the underlying substrate. In this way, the shrinkage that is a natural phenomenon of thermosetting resins that are cured also occurs away from the underlying substrate. The precured bonded laminate overlay will then experience only minimal shrinkage when later adhered to the solid substrate in a hot press. As a result, there is a drastic reduction in the amount of face checks and warping of the underlying solid substrate. (Louderback, U.S. Pat. No. 5,089,348)

Melamine impregnated decorative paper laminated to phenol formaldehyde impregnated kraft paper at temperatures of about 230–310° F. (110–155° C.) and pressures of greater than about 300 psi (20 bar) and preferably about 750–1500 psi. (51–102 bar) are commercially referred to as high pressure laminate. Melamine impregnated decorative paper laminated to particle board at temperatures of about 230–310° F. (110–155° C.) and pressures of up to about 300 psi. (20 bar) are commercially referred to as low pressure laminate. Lamination is done commercially in continuous and batch presses.

High pressure laminate can be adhesively bonded to a substrate material such as plywood, hardboard, particle board, cement-asbestos board, and the like, to give it additional strength and rigidity for its intended structural use. The bonding process usually requires, as the initial step, the sanding of the back surface of the laminate to ensure an adequate bond between the laminate and adhesive used in bonding the laminate and substrate material. The sanding step adds to the manufacturing costs of laminate. Laminates are relatively inflexible after the resins contained therein have been cured during the lamination process. Thin laminates (e.g., laminates comprising merely an overlay sheet, a decorative sheet, and single sheet of kraft paper or liner board) are particularly susceptible to damage during the sanding step due to their brittleness after lamination. The need for sanding can be obviated by coating the backing sheet with a thermoset adhesive. The resulting laminate is readily glueable to substrates with conventional adhesives. (Hosmer, et. al., U.S. Pat. No. 4,258,103)

A thin top coated decorative paper can be laminated to kraft liner board and used as a face ply for resin coated board. The thin top coating is a clear resin, preferably melamine resin. Alternatively, kraft liner board can be topcoated with resin and used as the to face ply for resin coated board. To prevent damage during manufacture, shipping and storage, the decorative paper can be prelaminated with a removable sheet of plastic, preferably a Mylar sheet. Mylar sheet provides temporary protection and is removed when the panel is put in use. A center ply is particleboard, fiberboard or plywood. A back ply can be kraft liner board. The face, center and back plies are adhesively bonded. Adhesive is applied between the plies. (Hale, Calif. 781,437, Valerius, U.S. Pat. No. 3,616,021, Van Dyek, U.S. Pat. No. 3,929,545, and Julian, et. al., U.S. Pat. No. 4,552,792)

There is a need for resin coated decorative paper with good stain and wear characteristics that can be adhesively bonded to particle board. There is a need for resin coated decorative paper that has been cured at pressures of greater than about 300 psi (20 bar) and preferably about 750–1500 psi (51–102 bar). There is a need for melamine resin coated decorative paper with sufficient substantially fully cured melamine resin on its wear surface for imparting good stain and wear characteristics. This decorative paper also needs to have substantially less resin on its back surface that is to be adhesively bonded to particle board. This decorative paper needs to have sufficient flexibility and not be brittle so that it can be handled without breaking. There is a need to produce melamine resin coated decorative paper with less resin for improving the cost of making the melamine resin coated decorative paper. There is a need for making melamine resin coated decorative paper without the need for making impregnated decorative paper prepregs. There is a need for reducing storage costs for decorative paper prepregs.

SUMMARY OF THE INVENTION

It has now been discovered that a coating of melamine resin can be applied to the decorative surface of paper without substantially interfering with the capability of adhesively bonding the paper to structural substrate such as particle board. Melamine resin that has been partially cured is placed on the surface of the decorative paper and substantially fully cured at pressures of greater than about 300 psi (20 bar) and preferably about 750–1500 psi (51–102 bar).

Flow is limited such that sufficient substantially fully cured melamine resin remains on the wear surface of the decorative paper for imparting good stain and wear characteristics. Flow through the decorative paper is limited such that the paper will be substantially fully impregnated with resin for imparting strength to the decorative paper while maintaining the capability of adhesively bonding the decorative paper to structural substrate such as particle board. Limiting the flow permits a reduction in the amount of resin required.

Melamine formaldehyde resin is recognized for its stain and wear characteristics and is the preferred resin. Mixtures of melamine formaldehyde resin with up to 33 percent urea formaldehyde resin by weight of the mixture are also useful. Flow under high temperature and pressure laminating conditions is limited by the extent the resin is partially cured. It is known to those skilled in the art of making laminates that the flow of resin under high temperature and pressure laminating conditions can be controlled by adjusting to cure conditions while partially curing the resin and by the selection and concentration of catalyst and other components in the resin formulation.

Resin can be impregnated into overlay, partially cured and placed over the wear surface of decorative paper that has not been impregnated with resin. Resin can also be coated on the wear surface of decorative paper and partially cured. The resin is partially cured for limiting its flow. Thereafter, it is substantially fully cured under high temperature and pressure laminating conditions.

A thermoplastic film can be placed over the resin impregnated overlay or decorative paper before the resin is partially cured coating for imparting decorative characteristics such as gloss or texture to the coating when the resin is cured. The thermoplastic film remain on the coated paper for providing support for the paper as it is being handled. The thermoplastic film can remain on coated paper bonded to structural substrate during the fabrication of an article and until a customer removes the thermoplastic film. Polyethylene terephthalate film begins to melt at temperatures above 446° F. (230° C.), substantially above the 230–310° F. (110–155° C.) temperatures that resins are cured under high pressure laminating conditions.

DETAILED DESCRIPTION OF THE INVENTION

Solid color and print decorative paper of this invention has a coating of resin on its wear surface. Solid color and print decorative paper useful in the making of high and low pressure decorative laminate are useful in making the melamine coated paper of this invention. It is impregnated with resin for strength. It can be adhesively bonded to substrate such as particle board. These properties can be obtained with manufacturing equipment and processes that are commercially used for making high pressure decorative laminate.

In one embodiment of this invention, resin is first impregnated into overlay and partially cured by passing the resin impregnated overlay through an oven. The overlay is positioned over decorative solid color or print paper that has not been impregnated with resin and laminated together under pressures of greater than about 300 psi (20 bar) and preferably about 750–1500 psi (51–102 bar). A plastic film can be positioned over the resin impregnated overlay and removably laminated to the overlay as the overlay and decorative paper are permanently laminated together. The plastic film can serve the function of a caul plate for imparting gloss and texture and as a separator sheet as is known in the art of making plastic laminate. Polyethylene terephthalate film begins to melt at temperatures above 230° C., substantially above the temperatures that the resins of this invention are cured. Caul plates, foil and separator sheets used in the making of high and low decorative laminate can also be used.

The resin content in the overlay is adjusted for providing the amount of resin needed for a wear resistant surface and for impregnating the decorative paper. This is less resin than is required for overlay laminated to decorative solid color and print paper and a core of resin impregnated kraft paper. This reduction in resin content provides an overlay that is less brittle than overlay treated to a higher resin content. Additionally, The overlay laminated to decorative solid color and print paper has sufficient flexibility be handled as it is being adhesively bonded to substrate.

The resin composition is adjusted for limiting flow as the partially cured resin in the overlay is laminated with decorative paper that has not been impregnated with resin. The resin in the overlay needs to flow through the decorative paper for impregnating and providing strength to the decorative paper. The flow needs to be limited so that the decorative side of the laminate has desired wear and decorative characteristics. The amount of resin on the opposite side of the laminate that is to be adhesively bonded to substrate is limited.

Conditions under which the resin is partially cured can be adjusted for controlling the flow of the resin during lamination. Catalyst can be selected for controlling flow. Resin flow of greater than about 20 percent by weight of resin impregnated overlay results in a laminate without enough resin on its decorative surface for having commercially significant wear and decorative characteristics. Resin flow of less than about 10 percent by weight of resin impregnated overlay results in a laminate without enough resin in the decorative paper for providing required strength. Preferred resin flow is about 12 to 17 percent by weight of resin impregnated overlay. Flow is determined from weight differences after pressing a 3 inch diameter piece of partially cured, resin impregnated overlay at 1000 psi and 320° F. (160° C.) for 5 minutes and breaking off the resin extending beyond the edge of the overlay.

The amount of resin in the overlay is also adjusted for the basis weight and porosity of the decorative paper. The basis weight and resin retaining capacity of the overlay are also considerations in controlling the flow of resin during lamination.

Resin content, volatile content and flow have been determined for an 8 pound per 3000 square foot ream overlay that is impregnated with melamine formaldehyde resin. This overlay is commercially available from Papierfabrik Schoeller & Hoesch GmbH, Hordener Strasse 3–7, D-76593 Gernsbach, Germany. A resin content of about 80 percent by weight of the impregnated overlay has been found to provide sufficient resin for lamination with solid color and print decorative paper having basis weights of about 50–80 pounds per 3000 square foot. A resin content of about 75–77 percent by weight of the impregnated overlay has been found to provide sufficient resin for lamination with print decorative paper having basis weights of about 50–75 pounds per 3000 square foot. At the lower resin content, laminate made with solid color decorative paper was mottled.

The volatile content of this resin was adjusted to about 6.5 percent by weight of the resin impregnated 8 pound per ream overlay. The flow of the resin was adjusted to about 15 percent by weight of the resin impregnated overlay. The resin was catalyzed with a commercially available p-toluenesulfonic acid catalyst for melamine formaldehyde resins. This catalyst is sold under the trade name of Madurit-835 and is commercially available from Hoechst Celanese Corp., P.O. Box 1026, Charolette, N.C. 28201–1026. Madurit-835 is described as an amine salt in an aqueous solution. The amine salt used in Madurit-835 is described as Morpholynium P-Tosylate. Esters of p-toluenesulfonic acid are known as tosylates. Morpholynium P-Tosylate has been assigned CAS number 13732-62-2.

In another embodiment, resin is coated on the decorative surface of solid color decorative paper. The resin impregnates the decorative paper and is partially cured. A resin content of about 40–45 and preferably about 41–43 percent by weight of the impregnated decorative paper has been found to provide sufficient resin for solid color decorative paper having basis weights of about 50–80 pounds per 3000 square foot. The flow is adjusted to about 1–3 and preferably about 1–2 percent by weight of the resin impregnated decorative paper. A plastic film can be removably laminated onto the decorative surface of the resin impregnated decorative paper as the resin is substantially fully cured under temperature and pressure.

Solid color and print decorative paper coated with melamine resin as described in these embodiments have been adhesively bonded to particle board with commercially available wood glue, vinyl acetate-ethylene copolymer adhesive. This adhesive is commercially available under the product name Airflex® Emulsion from Air Products and Chemicals, 7201 Hamilton Boulevard, Allentown, Pa. 18195-1501.

Resin is fully cured for achieving the benefits of this invention at pressures of at least 300 psi (20 bar) and preferably about 750–1500 psi (51–102 bar). In the embodiment of this invention with resin impregnated overlay supplying the resin during final cure for decorative paper, it has been found that less resin is on the adhesive bonding surface when the resin is fully cured under 450 psi than under 900 psi It is believed that the flow of resin increases as it cures under higher pressures.

EXAMPLES

Physical properties of embodiments of this invention are shown on Tables 1–3. Abrasion, stain, water and wax results were measured under National Electrical Manufacturers Association (NEMA) testing procedures. The resin was cured at 260–290° F. (126–143° C.) and at the pressures shown on Tables 1 and 2. Embodiments shown on Table 3 were cured at 900 psi. The vinyl acetate-ethylene copolymer adhesive used for bonding decorative paper coated with cured melamine resin to particleboard on Tables 1–3 is commercially available from Air Products and Chemicals, Inc., 7201 Hamilton Boulevard, Allentown, Pa. 18195-1501 under trade name Airflex® Emulsion.

The resin content of treated overlay paper shown on Tables 1 and 2, when used in making high pressure decorative laminate would have the following resin content. The 8 pound overlay would be treated to about 84 percent by weight of the treated overlay paper. The 12 pound overlay would be treated to about 80 percent by weight of the treated overlay paper. The 17 pound overlay would be treated to about 76.5 percent by weight of the treated overlay paper. The resin content of treated decorative paper shown on Table 3, when used in making high pressure decorative laminate has a resin content of about 54 percent by weight of the treated paper.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be

TABLE 1

PHYSICAL PROPERTIES OF NON TREATED SOLID COLOR PAPER LAMINATED WITH TREATED OVERLAY ADHESIVELY BONDED TO PARTICLEBOARD

| Overlay | Resin | Pressure | Flow | IP | NEMA | Stain | | Water | Wax |
| --- | --- | --- | --- | --- | --- | --- | --- | --- | --- |
| lb/Ream | lb/Ream | psi | wt. % | cycles | cycles | 1–10 | 11–15 | Hot | Hot |
| 8 | 79.9–81.0 | 450 | 9.4–14 | 530 | 663 | 6 | 6 | 6 | 6 |
| 8 | 79.9–81.0 | 900 | 9.4–14 | 286 | 588 | 6 | 6 | 6 | 6 |
| 12 | 69.5–71.2 | 900 | 17 | 790 | 1100 | 6 | 5* | 6 | 5 |
| 12 | 71.6–73.4 | 900 | 20 | 560 | 880 | 6 | 2* | 5 | 6 |
| 17 | 67.4–68.9 | 900 | 12 | 850 | 1340 | 6 | 5* | 6 | 6 |
| 17 | 71.8–72.1 | 900 | 21 | 530 | 845 | 6 | 2* | 6 | 6 |

*Staining from Iodine

TABLE 2

PHYSICAL PROPERTIES OF NON TREATED PRINT PAPER LAMINATED WITH TREATED OVERLAY ADHESIVELY BONDED TO PARTICLEBOARD

| Overlay | Resin | Pressure | Flow | IP | NEMA | Stain | | Water | Wax |
| --- | --- | --- | --- | --- | --- | --- | --- | --- | --- |
| lb/Ream | lb/Ream | psi | wt. % | cycles | cycles | 1–10 | 11–15 | Hot | Hot |
| 8 | 79.9–81.0 | 450 | 9.4–14 | 212 | 371 | 6 | 6 | 6 | 6 |
| 8 | 79.9–81.0 | 900 | 9.4–14 | 138 | 334 | 6 | 6 | 6 | 6 |
| 12 | 69.5–71.2 | 900 | 17 | 223 | 453 | 6 | 6 | 6 | 6 |
| 12 | 71.6–73.4 | 900 | 20 | 212 | 570 | 6 | 6 | 6 | 6 |
| 17 | 67.4–68.9 | 900 | 12 | 530 | 795 | 6 | 6 | 6 | 6 |
| 17 | 71.8–72.1 | 900 | 21 | 265 | 480 | 6 | 6 | 6 | 5 |

TABLE 3

PHYSICAL PROPERTIES OF TREATED SOLID COLOR PAPER ADHESIVELY BONDED TO PARTICLE BOARD

| Resin | Volatile | Flow | IP | NEMA | Stain | | Water | Wax |
| --- | --- | --- | --- | --- | --- | --- | --- | --- |
| lb/Ream | wt. % | wt. % | cycles | cycles | 1–10 | 11–15 | Hot | Hot |
| 42.2–42.2 | 6.0 | 1.4 | 636 | 832 | 6 | 6 | 6 | 6 |
| 42.6–42.9 | 6.6 | 1.4 | 636 | 848 | 6 | 6 | 6 | 6 |

We claim:

1. A method of preparing a low pressure decorative laminate, the method comprising:
   (a) impregnating an α-cellulose overlay paper with a curable melamine formaldehyde thermoset resin;
   (b) partially curing the resin in the impregnated overlay paper to prepare an overlay prepreg, wherein the overlay prepreg is characterized by having a resin flow from a stack of twelve 3 inch diameter discs of the overlay prepreg placed between sheets of aluminum foil and pressed at a pressure of 1000 psi and a temperature of 320±5° F. (160 ° C.) for 5 minutes of about 10–20 percent of the original weight of the stack;
   (c) contacting the overlay prepreg and the decorative surface of a decorative paper having a decorative surface and a back surface, wherein the decorative paper has not been impregnated with resin;
   (d) heating the contacted overlay prepreg and decorative paper to a temperature of about 230° F. to about 310° F. (about 110° F. to about 155° C.) under pressures of greater than about 300 psi (20 bar) to cause resin to flow from the overlay prepreg into the decorative paper and to fully cure the resin to form resin coated decorative paper;
   (e) adhering a supporting member and the back surface of the decorative paper using an adhesive; and
   (f) heating the adhered supporting member and decorative paper to a temperature of about 230° F. to about 310° F. (about 110° C. to about 155° C.) under pressures less than about 300 psi (20 bar) to form a low pressure decorative laminate.

2. The method of claim 1, wherein the resin flow is about 12–17 percent of the combined weight of the stack.

3. The method of claim 1, wherein pressure of about 750–1500 psi (51–102 bar) is applied to the contacted overlay prepreg and decorative paper during heating step (c).

4. A method of preparing low pressure decorative laminate, the method comprising:
   (a) providing an assembly comprising a high pressure decorative laminate, an adhesive, and a supporting member, wherein:
      the high pressure decorative laminate comprises a first layer of resin impregnated α-cellulose overlay paper, and a second layer of resin coated decorative paper;
      the resin comprises fully cured melamine formaldehyde thermoset resin;
      the high pressure decorative laminate was formed at a temperature in the range of about 230° F. to about 310° F. (about 110° C. to about 155° C.) and pressures of greater than about 300 psi (20 bar); and
      the adhesive adheres the high pressure decorative laminate to the supporting member; and
   (b) heating the assembly to a temperature of about 230° F. to about 310° F. (about 110° C. to about 155° C.) under pressures less than about 300 psi (20 bar) to form a low pressure decorative laminate.

5. The method of claim 4, wherein:
   the resin further comprises urea formaldehyde thermoset resin; and
   the urea formaldehyde thermoset resin comprises up to about 33 weight percent of the total weight of urea formaldehyde thermoset resin and melamine formaldehyde thermoset resin.

6. The method of claim 1 wherein the supporting member is particle board.

7. The method of claim 4 wherein the supporting member is particle board.

8. A method of preparing low pressure decorative laminate, the method comprising:
   (a) impregnating an α-cellulose overlay paper with a curable melamine formaldehyde thermoset resin;
   (b) partially curing the resin in the impregnated overlay paper to provide an overlay prepreg, wherein the overlay prepreg is characterized by having a resin flow from a stack of twelve 3 inch diameter discs of the overlay prepreg placed between sheets of aluminum foil and pressed at a pressure of 1000 psi (67 bar) and a temperature of 320±5° F. (160° C.) for 5 minutes of about 10–20 percent of the original weight of the stack;
   (c) contacting the overlay prepreg and the decorative surface of a decorative paper comprising a decorative surface and a back surface, wherein the decorative paper has not been impregnated with resin;
   (d) heating the contacted overlay prepreg and decorative paper to a temperature of about 230° F. to about 310° F. (about 110° C. to about 155° C.) under pressures of greater than about 300 psi (20 bar) to cause resin to flow from the overlay prepreg into the decorative paper and to fully cure the resin to form resin coated decorative paper;
   (e) adhering particle board and the back surface of the decorative paper using an adhesive; and
   (f) heating the adhered particle board and decorative paper to a temperature of about 230° F. to about 310° F. (about 110° C. to about 155° C.) under pressures less than about 300 psi (20 bar) to form a low pressure decorative laminate.

9. A method of preparing decorative paper having a wear resistant thermoset resin coating on its decorative surface, the method comprising:
   impregnating an α-cellulose overlay paper with a curable resin mixture comprising melamine formaldehyde thermoset resin and urea formaldehyde thermoset resin, wherein the urea formaldehyde resin comprises up to about 33 percent by weight of the resin mixture;
   partially curing the resin mixture in the impregnated overlay paper to prepare an overlay prepreg, wherein the overlay prepreg is characterized by having a resin flow from a stack of twelve 3 inch diameter discs of the overlay prepreg placed between sheets of aluminum foil and pressed at a pressure of 1000 psi (67 bar) and a temperature of 320±5° F. (160° C.) for 5 minutes of about 10–20 percent of the original weight of the stack;
   contacting the overlay prepreg and the decorative surface of decorative paper, wherein the decorative paper has not been impregnated with resin; and
   heating the contacted overlay prepreg and decorative paper to a temperature of about 230° F. to about 210° F. (about 110° C. to about 155° C.) under pressures of greater than about 300 psi (20 bar) to cause resin to flow from the overlay prepreg into the decorative paper and to fully cure the resin mixture.

* * * * *